US008360396B2

(12) United States Patent
Robledo

(10) Patent No.: US 8,360,396 B2
(45) Date of Patent: Jan. 29, 2013

(54) LEVERAGE TOOL FOR A CRANK ASSEMBLY OF A RADAR SYSTEM

(75) Inventor: Jaime Robledo, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 805 days.

(21) Appl. No.: 12/405,524

(22) Filed: Mar. 17, 2009

(65) Prior Publication Data

US 2010/0237300 A1 Sep. 23, 2010

(51) Int. Cl.

| | |
|---|---|
| ***B66F 13/00*** | (2006.01) |
| ***B66F 15/00*** | (2006.01) |
| ***B66F 3/24*** | (2006.01) |
| ***B66F 3/00*** | (2006.01) |
| ***B25C 11/00*** | (2006.01) |
| ***A62B 3/00*** | (2006.01) |
| ***E21D 15/44*** | (2006.01) |
| ***E04D 15/00*** | (2006.01) |
| ***B23P 19/04*** | (2006.01) |
| *F16H 21/00* | (2006.01) |

(52) U.S. Cl. ............. 254/25; 254/1; 254/93 R; 254/131; 81/45; 29/267

(58) Field of Classification Search .................... 254/25, 254/1, 93 R, 131, 323; 81/45; 29/267, 275
See application file for complete search history.

(56) References Cited

U.S. PATENT DOCUMENTS

| | | | | |
|---|---|---|---|---|
| 4,182,390 | A * | 1/1980 | Renner | 81/45 |
| D309,703 | S * | 8/1990 | Walker | D8/89 |
| 5,054,180 | A * | 10/1991 | Combs | 29/275 |
| 5,176,363 | A * | 1/1993 | Bowlin | 254/131 |
| 5,402,984 | A | 4/1995 | Crockett, IV et al. | 254/98 |
| 5,423,114 | A * | 6/1995 | Johnson | 29/267 |
| 5,447,289 | A * | 9/1995 | Callahan | 254/131 |
| D378,187 | S * | 2/1997 | Eddie | D8/88 |
| 5,749,113 | A * | 5/1998 | Witter | 7/166 |
| 5,833,217 | A | 11/1998 | Goldsby | 254/266 |
| 5,875,535 | A * | 3/1999 | Canoy | 29/275 |
| 6,095,018 | A | 8/2000 | Schuster | 81/177.5 |
| 6,113,074 | A * | 9/2000 | Foley | 254/25 |
| 6,293,522 | B2 * | 9/2001 | Dobmeier et al. | 254/323 |
| 6,298,512 | B1 * | 10/2001 | Hagen | 7/166 |
| 6,375,382 | B1 | 4/2002 | Clavet | 403/359.5 |
| 6,530,559 | B1 * | 3/2003 | Pell | 254/93 R |
| 6,988,711 | B2 * | 1/2006 | Skach | 254/25 |
| 7,090,196 | B1 * | 8/2006 | Linker | 254/1 |
| 7,195,140 | B1 * | 3/2007 | Marinelli | 224/222 |
| 7,582,093 | B2 * | 9/2009 | Vasta et al. | 606/104 |

* cited by examiner

*Primary Examiner* — Lee D Wilson
*Assistant Examiner* — Alvin Grant
(74) *Attorney, Agent, or Firm* — Thorpe North & Western LLP

(57) ABSTRACT

An apparatus may comprise a lever operable to rotate a crank arm. The apparatus may further comprise a slotted member affixed to an end of the lever. The slotted member may be operable to clip around a first handle of the crank arm. The apparatus may further comprise an alignment member affixed to the lever. The alignment member may comprise a hole that receives a second handle of the crank arm. The apparatus may further comprise a third handle affixed to the lever such that a force applied to the third handle causes the lever to rotate. The rotation of the lever may cause the crank arm to rotate in a particular plane. The third handle may be offset from the particular plane.

21 Claims, 5 Drawing Sheets

LEVERAGE TOOL FOR A CRANK ASSEMBLY OF A RADAR SYSTEM

GOVERNMENT FUNDING

The U.S. Government may have certain rights in this invention as provided for by the terms of U.S. Government Contract No. DAAH01-03-C-0140 granted by the Department of the Army.

TECHNICAL FIELD

This disclosure relates generally to crank assemblies and more particularly to a leverage tool for a crank assembly of a radar system.

BACKGROUND

Traditional radar systems use a linear jack to elevate a radar antenna. An operator actuates the linear jack by manually rotating a crank arm. The operator must usually rotate the crank arm several times to fully elevate the radar antenna. In traditional systems, the crank arm is generally too short to provide sufficient leverage for the operator to easily elevate the radar antenna. The crank arm is sometimes located on the radar system in a position that is difficult for the operator to reach. As a result, rotating the crank arm often causes the operator to become fatigued. In addition, in traditional systems, the crank arm is located near hardware, wiring, and other objects. As a result, when the operator rotates the crank arm, the operator's hand sometimes hits these objects, resulting in injury to the operator.

SUMMARY OF THE INVENTION

In some embodiments, an apparatus comprises a lever operable to rotate a crank arm. The apparatus may further comprise a slotted member affixed to an end of the lever. The slotted member may be operable to clip around a first handle of the crank arm. The apparatus may further comprise an alignment member affixed to the lever. The alignment member may comprise a hole that receives a second handle of the crank arm. The apparatus may further comprise a third handle affixed to the lever such that a force applied to the third handle causes the lever to rotate. The rotation of the lever may cause the crank arm to rotate in a particular plane. The third handle may be offset from the particular plane.

Various embodiments described herein may have none, some, or all of the following advantages. One advantage is that a radar system may comprise a leverage tool for raising and lowering a radar antenna. The leverage tool may be secured without any fasteners to a crank arm of a jack coupled to the radar antenna. In some embodiments, the leverage tool comprises a lever that is longer than the crank arm. As a result, the leverage tool may provide greater leverage to an operator in rotating the crank arm. Thus, the leverage tool may permit the operator to raise and lower the radar antenna without becoming fatigued. In addition, because the leverage tool may be longer than the crank arm, the operator may more easily reach the leverage tool, which may permit the operator to maintain better posture and/or more secure footing while raising and lowering the radar antenna Another advantage is that the leverage tool may comprise a handle that is offset from the crank arm of the jack. In some embodiments, the lever handle may be outside the plane of the hardware associated with the radar antenna. Consequently, an operator may rotate the lever handle without risking that his or her hands will be injured by impacting the hardware associated with the radar antenna. Other advantages of the present disclosure will be readily apparent to one skilled in the art from the description and the appended claims.

BRIEF DESCRIPTION OF THE DRAWINGS

For a more complete understanding of the present disclosure and the advantages thereof, reference is now made to the following description taken in conjunction with the accompanying drawings, in which.

DETAILED DESCRIPTION

Figure 1A:
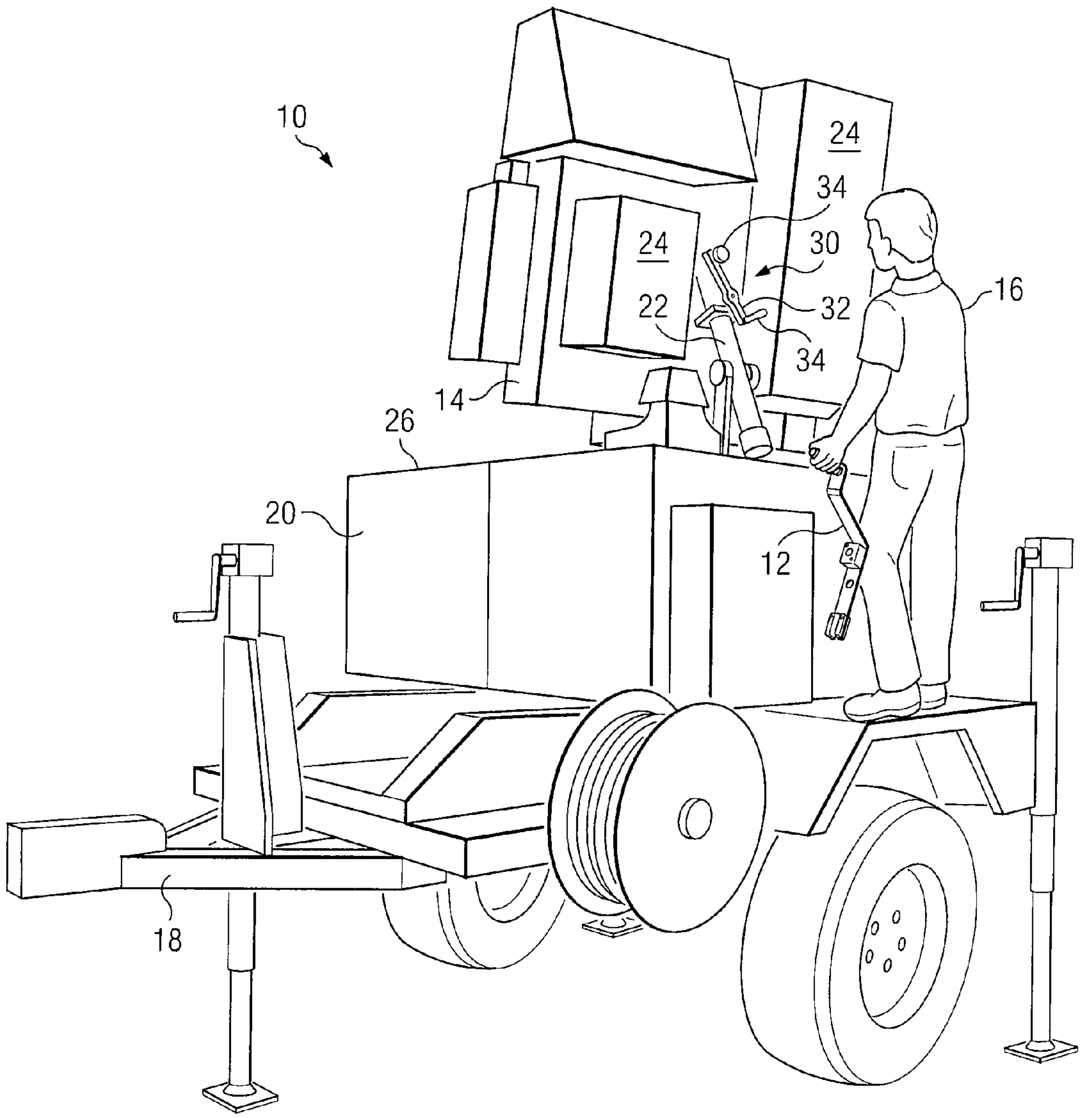
FIGS. 1A to 1B illustrate a radar system comprising a leverage tool, according to certain embodiments.

FIG. 1A illustrates a radar system 10 comprising a leverage tool 12, according to certain embodiments. Radar system 10 may be a portable or non-portable communication system that receives and/or transmits electromagnetic waves. Radar system 10 may use electromagnetic waves to detect and determine the location, range, altitude, direction, and/or speed of moving and/or fixed objects. Radar system 10 may detect any suitable object such as, for example, aircraft, ships, missiles, and/or motor vehicles. In some embodiments, radar system 10 may be a portable system that comprises a radar antenna 14 that is stowed while radar system 10 is in transit and that is erected when radar system 10 is in use. Radar system 10 may comprise leverage tool 12 that permits an operator 16 to quickly and safely move radar antenna 14 between the stowed position and the erect position. In some embodiments, radar system 10 comprises a trailer 18, radar platform 20, radar antenna 14, jack 22, and leverage tool 12.

Trailer 18 may be a powered or unpowered vehicle that may be attached to and/or moved (e.g., pulled, pushed, etc.) by another vehicle. Trailer 18 may be coupled to a vehicle using any suitable coupling such as, for example, a tow-ball hitch, a lunette ring, and/or a pintle hook. Trailer 18 may be any suitable type of trailer 18 such as, for example, a single-axle trailer or a multi-axle trailer.

In some embodiments, radar platform 20 may be mounted on trailer 18. Radar platform 20 may comprise a base that supports radar antenna 14. Radar platform 20 may comprise one or more compartments that house transmitters, control systems, power management systems, and/or user interfaces that permit operator 16 to interact with radar system 10. Radar platform 20 may physically support radar antenna 14 during transit and operation. Radar platform 20 may elevate radar antenna 14 sufficiently to transmit and receive radar signals.

Radar platform 20 may support radar antenna 14. Radar antenna 14 may comprise a transmitter that emits electromagnetic waves. In addition, or alternatively, radar antenna 14 may comprise a receiver that detects electromagnetic waves that are reflected by a target such as, for example, an enemy aircraft or tank. By detecting electromagnetic waves reflected by a target, radar system 10 may determine the location, range, altitude, direction, and/or speed of the target. Thus, radar system 10 may detect and alert operator 16 to the presence of a target.

Radar antenna 14 may be any suitable type of antenna. For example, radar antenna 14 may be a pulse-doppler radar antenna, an omni-directional antenna, a uni-directional antenna, a parabolic antenna, a phased array antenna, a slotted waveguide antenna, and/or any suitable type of antenna. In some embodiments, radar antenna 14 may comprise one or more cabinets 24 that house one or more transmitters, duplexers, receivers, control circuits, and/or other hardware. Radar antenna 14 may be attached to radar platform 20 by at least one jack 22. Radar antenna 14 may have any suitable dimensions and/or weight. In some embodiments, radar antenna 14 weighs at least 225.0 kilograms. As a result, the axial load on jack 22 in raising radar antenna 14 from a horizontal position may be at least 6,800.0 kilograms.

Jack 22 may be any suitable device that moves radar antenna 14 between a stowed position and an erect position. In general, when trailer 18 is in transit, radar antenna 14 is maintained in a stowed position on radar platform 20. In the stowed position, radar antenna 14 may rest horizontally on a surface 26 of radar platform 20. By placing radar antenna 14 in the stowed position while transporting trailer 18, operator 16 may protect radar antenna 14 from damage due to impacts, vibrations, and/or sudden stops. When operator 16 reaches the desired destination, operator 16 may use jack 22 to elevate radar antenna 14 to an erect position. In the erect position, a receiving surface of radar antenna 14 may be vertical or angled such that radar antenna 14 may transmit and detect electromagnetic waves.

Jack 22 may be any suitable device that provides a mechanical advantage for lifting heavy objects. In some embodiments, jack 22 is a manual or automated transmission tool that moves an object along a linear or non-linear path. Jack 22 may be mechanically, hydraulically, and/or electrically actuated. In some embodiments, jack 22 is a mechanical jack such as, for example, a ball screw jack, a worm gear screw jack, a rack and pinion jack, and/or any suitable type of mechanical jack.

In some embodiments, jack 22 comprises one or more crank assemblies 30. Crank assembly 30 may comprise a crank arm 32 and one or more crank handles 34. Operator 16 may actuate jack 22 by rotating crank arm 32. In traditional systems, crank arm 32 was too short to provide operator 16 with adequate leverage to easily actuate jack 22. The limited leverage of crank arm 32 in traditional systems sometimes caused operator 16 to become fatigued when rotating crank arm 32 to actuate jack 22. In addition, in traditional systems, crank arm 32 was configured to rotate in the same plane as cabinets 24 affixed to radar antenna 14. Consequently, when rotating crank arm 32 in traditional systems, the hands of operator 16 sometimes impacted cabinets 24, resulting in hand injuries.

Figure 1B:
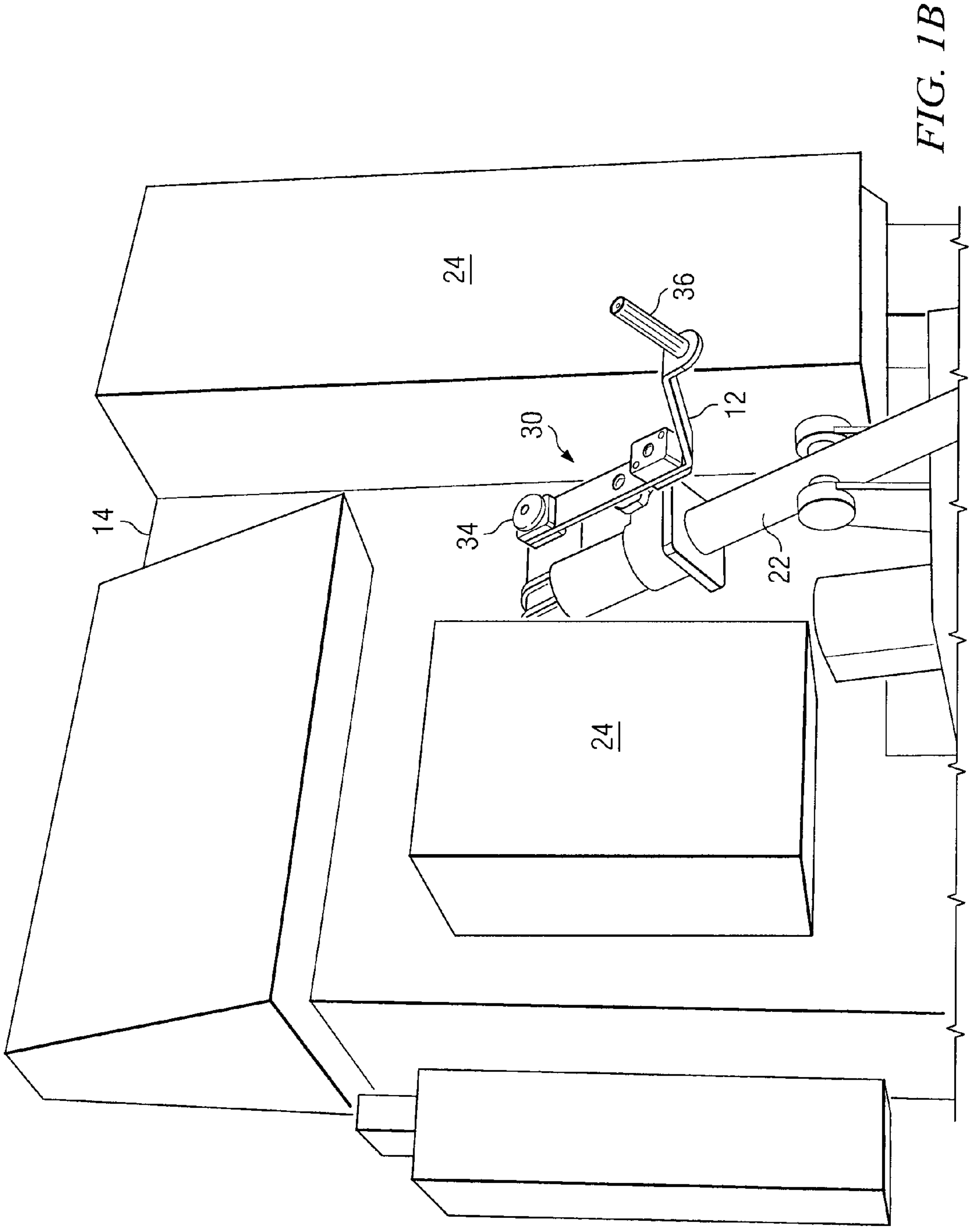

In contrast to traditional systems, the present radar system 10 comprises a leverage tool 12 that may protect the hands of operator 16 from injury and/or may increase the mechanical advantage for actuating jack 22. FIG. 1B illustrates leverage tool 12 attached to crank handles 34, according to certain embodiments. Operator 16 may easily attach leverage tool 12 to crank handles 34 without using extraneous fasteners. Leverage tool 12 may be light-weight and easily removable from crank handles 34. In some embodiments, leverage tool 12 comprises a wear-resistant interface that protects crank handles 34 from wear or damage. Leverage tool 12 may comprise a rotatable handle that is offset from the plane(s) in which crank arm 32 and/or crank handles 34 rotate. The offset position of lever handle 36 may protect the hands of operator 16 from impacting cabinets 24 affixed to radar antenna 14. In addition, or alternatively, leverage tool 12 may be longer than crank arm 32. As a result, leverage tool 12 may provide operator 16 with greater mechanical advantage than crank arm 32 in raising and/or lowering radar antenna 14. Accordingly, leverage tool 12 may allow operator 16 to raise and lower radar antenna 14 more quickly and/or safely than in traditional systems.

Although FIGS. 1A and 1B illustrate radar antenna 14 affixed to trailer 18, it should be understood that radar antenna 14 may be affixed to and transported by a vehicle other than trailer 18. For example, radar antenna 14 may be affixed to an automobile, truck, helicopter, airplane, and/or boat.

Although FIGS. 1A and 1B illustrate using leverage tool 12 to actuate jack 22 for raising and/or lowering radar antenna 14, it should be understood that leverage tool 12 may be used to rotate any suitable type of crank assembly 30. It should be further understood that leverage tool 12 may be used to actuate jack 22 to raise and/or lower any suitable object. For example, leverage tool 12 may be used to actuate jack 22 to lift vehicle, to stabilize a vehicle (e.g., motor home), and/or to move any suitable object.

Figure 2:
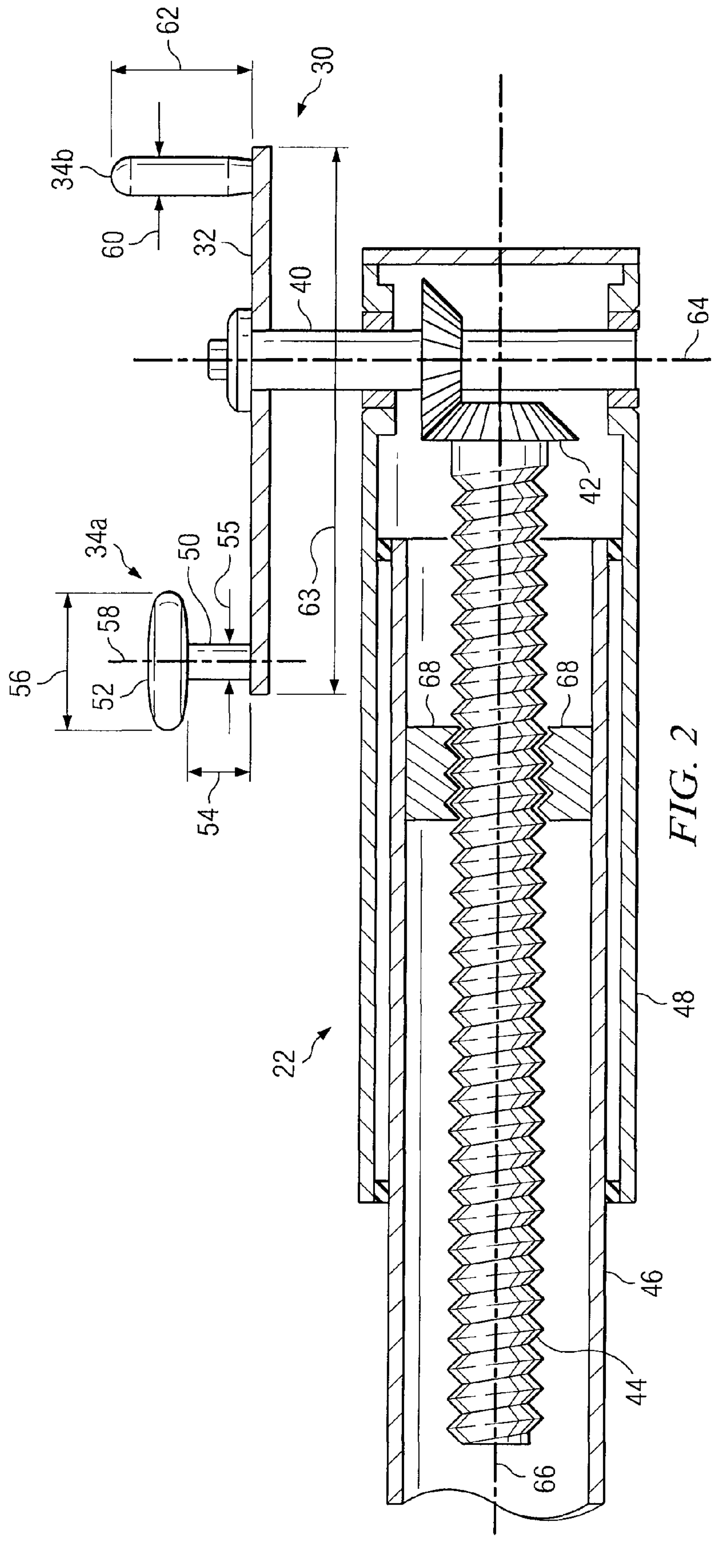
FIG. 2 illustrates a jack for moving a radar antenna, according to certain embodiments.

FIG. 2 illustrates jack 22 for moving radar antenna 14, according to certain embodiments. Jack 22 may be a manual or automated transmission tool that moves an object along a linear or non-linear path. Radar system 10 may comprise any suitable type and/or combination of jacks 22. In some embodiments, jack 22 is a hydraulic jack or an electric jack. In other embodiments, jack 22 is a mechanical jack such as, for example, a ball screw jack, a worm gear screw jack, and/or a rack and pinion jack. According to certain embodiments, jack 22 comprises a crank assembly 30, gear shaft 40, gear 42, screw 44, inner tube 46, and outer tube 48.

As explained above, crank assembly 30 may comprise one or more crank handles 34 and crank arm 32. Crank handle 34 may be any suitable structure that operator 16 may grip to rotate crank arm 32. For example, crank handle 34 may be a knob, shaft, tube, protrusion, post, and/or other suitable handle. Crank handle 34 may comprise a metal, polymer, composite, and/or any suitable type and/or combination of materials. In some embodiments, crank assembly 30 may comprise at least two crank handles 34—a mushroom handle 34*a* and a post handle 34*b*.

Mushroom handle 34*a* may comprise a stem 50 that is perpendicular to crank arm 32. Mushroom handle 34*a* may further comprise a cap 52 that is perpendicular to stem 50. A particular end of stem 50 may be affixed to crank handle 34, and the other end (i.e., the distal end) of stem 50 may be affixed to cap 52. In some embodiments, stem 50 of mushroom handle 34*a* is cylindrical. In other embodiments, stem 50 of mushroom handle 34*a* comprises a cross-section that is square, hexagonal, or other suitable shape. Stem 50 of mushroom handle 34*a* may have any suitable dimensions. In some embodiments, stem 50 of mushroom handle 34*a* is from 1.0 cm to 3.5 cm in diameter 55. In other embodiments, stem 50 of mushroom handle 34*a* is from 1.5 cm to 2.5 cm in diameter 55. In some embodiments, stem 50 of mushroom handle 34*a* has a height 54 that is from 0.5 cm to 12.0 cm. In other embodiments, stem 50 of mushroom handle 34*a* has height 54 that is from 1.5 cm to 5.0 cm.

Cap of mushroom handle 34*a* may resemble a sphere, a hemisphere, an oblate spheroid, an ellipsoid, and/or any suitable shape. Mushroom handle 34*a* may be affixed to crank arm 32 using bearings or other suitable fasteners such that mushroom handle 34*a* rotates relative to crank arm 32. In some embodiments, cap 52 of mushroom handle 34*a* may be configured such that a hand of operator 16 grips cap 52 with the palm parallel to crank arm 32 (e.g., the palm perpendicular to stem 50 of mushroom handle 34*a*). Cap 52 of mushroom handle 34*a* may have any suitable dimensions. In some embodiments, cap 52 of mushroom handle 34*a* has a diameter 56 that is larger than diameter 55 of stem 50 of mushroom handle 34*a*. Thus, when leverage tool 12 interfaces with stem 50 of mushroom handle 34*a*, cap 52 may prevent leverage tool 12 from sliding along the axis 58 of mushroom handle 34*a*. In some embodiments, diameter 56 of cap 52 of mushroom handle 34*a* is at least fifty percent larger than diameter 55 of stem 50. According to certain embodiments, diameter 56 of cap 52 is from 2.0 cm to 15.0 cm. In other embodiments, diameter 56 of cap 52 is from 2.5 cm to 7.0 cm. In some embodiments, mushroom handle 34*a* may be affixed to one end of crank arm 32 and post handle 34*b* may be affixed to the other end of crank arm 32.

Post handle 34*b* may comprise any suitable post, protrusion, or tube structure without a cap 52. Post handle 34*b* may be perpendicular to crank arm 32. In some embodiments, post handle 34*b* is cylindrical. In other embodiments, the cross-section of post handle 34*b* is hexagonal, octagonal, or other suitable shape. Post handle 34*b* may be configured such that a hand of operator 16 grips post handle 34*b* with the palm parallel to post handle 34*b* (i.e., perpendicular to crank arm 32). Post handle 34*b* may be affixed to crank arm 32 using bearings and/or other suitable fasteners such that post handle 34*b* rotates relative to crank arm 32.

Post handle 34*b* may have any suitable dimensions. In some embodiments, post handle 34*b* is from 1.0 cm to 3.5 cm in diameter 60. In other embodiments, post handle 34*b* is from 1.5 cm to 2.5 cm in diameter 60. In some embodiments, post handle 34*b* has a height 62 that is from 2.0 cm to 20.0 cm. In other embodiments, post handle 34*b* has height 62 that is from 5.0 cm to 15.0 cm.

Mushroom handle 34*a* and post handle 34*b* may be coupled to crank arm 32. Operator 16 may apply a force to mushroom handle 34*a* and/or post handle 34*b* to cause crank arm 32 to rotate about a crank axis 64. Crank arm 32 may comprise any suitable material such as, for example, steel, aluminum, fiber composite, and/or any suitable material. Crank arm 32 may have any suitable dimensions. In some embodiments, the length 63 of crank arm 32 may be from 16.0 cm to 45.0 cm. In other embodiments, length 63 of crank arm 32 may be from 22.0 cm to 30.0 cm. Crank arm 32 may be coupled to gear shaft 40 such that the rotation of crank arm 32 may cause gear shaft 40 to rotate about crank axis 64. Crank arm 32 may comprise a rod, tube, shaft, bar, and/or other suitable structure. In some embodiments, crank arm 32 is perpendicular to gear shaft 40. Crank arm 32 may comprise any suitable material such as, for example, steel, aluminum, titanium, plastic, carbon fiber composite, and/or any suitable type and/or combination of materials. In some embodiments, the distance between one crank handle 34 and crank axis 64 may be different from the distance between the other crank handle 34 and crank axis 64. Thus, each crank handle 34 may provide a different mechanical advantage.

As explained above, the rotation of crank arm 32 may cause gear shaft 40 to rotate. Gear shaft 40 may be coupled to one or more gears 42, which may be coupled to screw 44. The rotation of gear shaft 40 may cause screw 44 to rotate about a screw axis 66. Screw 44 may comprise a threaded rod, tube, or other suitable shaft. The rotation of screw 44 may cause inner tube 46 to move along screw axis 66 relative to outer tube 48. In some embodiments, inner tube 46 may comprise one or more threaded inserts 68 that contact one or more threads of screw 44. The rotation of screw 44 may cause threaded insert 68 and inner tube 46 to move along screw axis 66. Thus, the rotation of screw 44 may cause inner tube 46 to extend and retract along screw axis 66 relative to outer tube 48 and crank assembly 30.

In some embodiments, one end of jack 22 may be affixed to radar platform 20 and the other end of jack 22 may be affixed to radar antenna 14. When crank arm 32 rotates in a particular direction, inner tube 46 of jack 22 may extend and cause radar antenna 14 to move from a stowed position to an erect position. When crank arm 32 rotates in the opposite direction, inner tube 46 of jack 22 may retract and cause radar antenna 14 to move from the erect position to the stowed position. Thus, the rotation of crank arm 32 may cause jack 22 to extend or retract, which in turn may cause radar antenna 14 to raise or lower on radar platform 20.

Although FIG. 2 illustrates a screw-type jack 22, it should be understood that jack 22 may be any suitable type of jack 22 such as, for example, a rack and pinion jack. In addition, although FIG. 2 illustrates crank assembly 30 comprising a single crank arm 32 and two crank handles 34, it should be understood that crank assembly 30 may comprise any suitable number and/or combination of crank arms 32 and/or crank handles 34.

Figure 3:
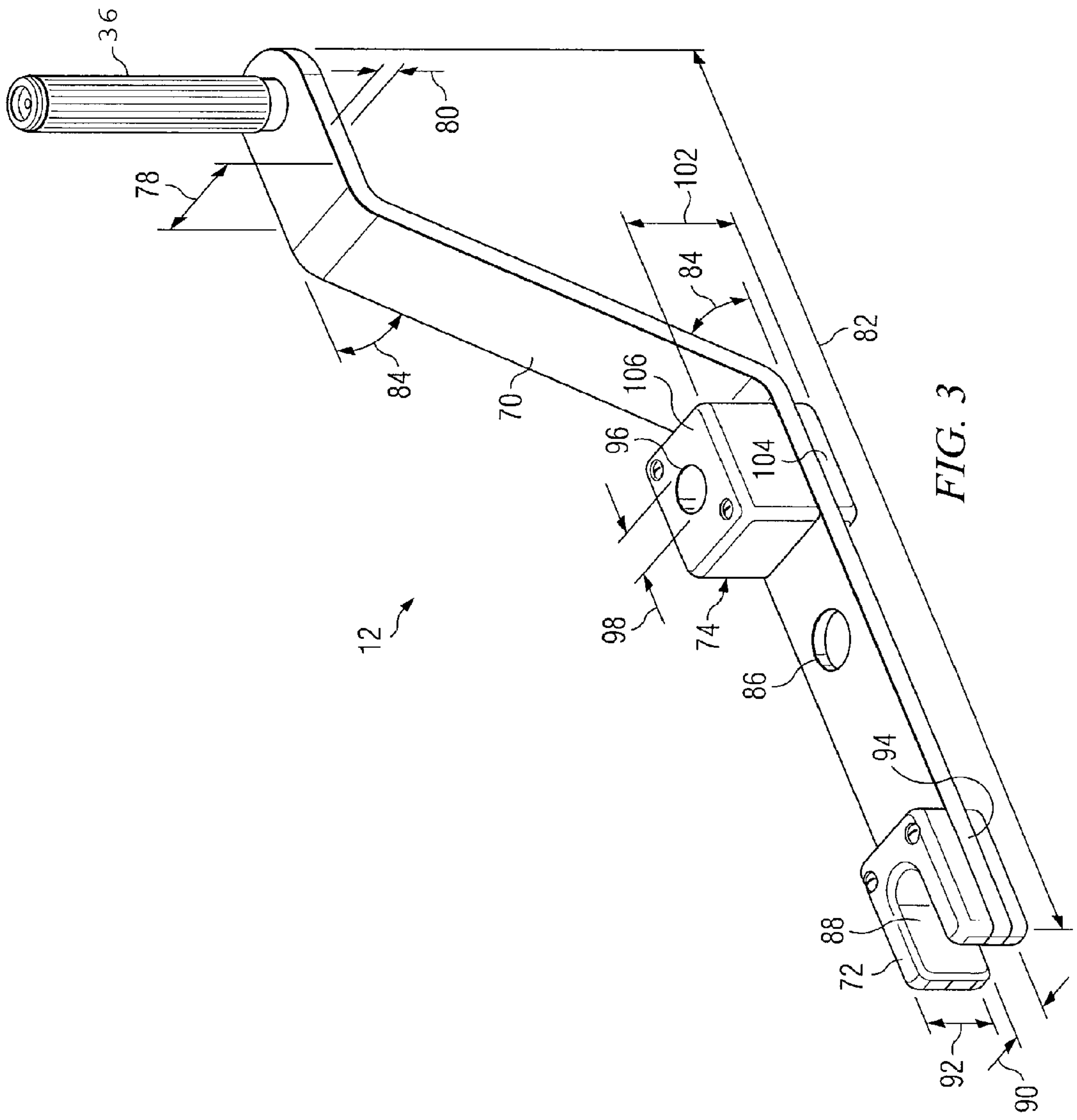
FIG. 3 illustrates a leverage tool that is configured to interface with a crank assembly, according to certain embodiments.

FIG. 3 illustrates leverage tool 12 that is configured to interface with crank assembly 30, according to certain embodiments. As discussed above, operator 16 may use leverage tool 12 to rotate crank assembly 30, thereby causing jack 22 to extend or retract. By extending or retracting jack 22, operator 16 may cause radar antenna 14 affixed to jack 22 to move between a stowed position and an erect position. In some embodiments, leverage tool 12 comprises a lever 70, a slotted member 72, an alignment member 74, and lever handle 36.

Lever 70 may comprise any suitable device that provides a mechanical advantage for rotating crank arm 32. For example, lever 70 may comprise a rod, bar, shaft, and/or other suitable device for rotating crank arm 32. Lever 70 may be formed from any suitable material. In some embodiments, lever 70 is formed from metal such as, for example, stainless steel, iron, aluminum, and/or any suitable type and/or combination of metals. In other embodiments, lever 70 is formed from one or more non-metal materials such as, for example, a polymer, carbon fiber, and/or fiberglass material. In some embodiments, lever 70 comprises a metal strip that is formed to interface with crank handles 34. For example, lever 70 may comprise a metal strip that has a width 78 from 3.0 cm to 10.0 cm, a height 80 from 0.25 cm to 3.0 cm, and a length 82 from 18.0 cm to 100.0 cm. In some embodiments, lever 70 may have width 78 from 4.0 cm to 6.0 cm, height 80 from 0.25 cm to 2.0 cm, and length 82 from 30.0 to 50.0 cm.

Lever 70 may be substantially straight or bent. In some embodiments, lever 70 may be bent in at least one dimension in order to provide clearance between lever handle 36 and cabinets 24 associated with radar antenna 14. In some embodiments, lever 70 is bent within a plane perpendicular to the plane of rotation of crank arm 32. Lever 70 may be bent according to any suitable angle 84. In some embodiments, lever 70 may be bent at angle 84 between twenty and sixty degrees. According to certain embodiments, lever 70 may be bent at angle 84 between thirty and fifty degrees. In some embodiments, lever 70 may be bent in more than one location such that the portion of lever 70 between slotted member 72 and alignment member 74 is parallel to, but offset from, the portion of lever 70 to which lever handle 36 is affixed. In some embodiments, lever 70 is angled such that lever handle 36 is offset from the plane in which crank arm 32 rotates by at least five centimeters.

In some embodiments, one or more notches and/or holes may be formed in lever 70. For example, two or more prongs 94 may be formed in at least one end of lever 70 to permit lever 70 to interface with slotted member 72. Prongs 94 in lever 70 may be formed by machining a notch in at least one end of lever 70. As another example, a hole may be formed in at least one end of lever 70 to permit lever handle 36 to be affixed to lever 70. In some embodiments, a pivot hole 86 may be formed between the ends of lever 70. Pivot hole 86 may permit operator 16 to align lever 70 with crank axis 64 about which crank arm 32 pivots. According to certain embodiments, an alignment hole 96 may be formed between pivot hole 86 and the hole for lever handle 36. Alignment hole 96 may be configured to interface with at least one crank handle 34. In some embodiments, one or more additional holes may be formed in lever 70 to permit fasteners to secure slotted member 72 and/or alignment member 74 to lever 70. The holes and/or notches in lever 70 may be formed according to any suitable method. For example, the holes and/or notches may be milled, bored, and/or cast in lever 70.

According to certain embodiments, a finish may be applied to lever 70 to protect lever 70 from corrosion and/or wear. In some embodiments, lever 70 may be anodized to increase the surface hardness of lever 70. For example, if lever 70 is formed from aluminum (e.g., 50-52 aluminum) or other suitable metal, lever 70 may be anodized (e.g., type III, class 2) to harden and/or protect lever 70.

In some embodiments, leverage tool 12 may comprise slotted member 72 affixed to lever 70. Slotted member 72 may comprise any suitable structure for interfacing with crank handle 34. In some embodiments, slotted member 72 may comprise a slot 88 that is configured to interface with mushroom handle 34*a* of crank assembly 30. Slot 88 in slotted member 72 may have a width 90 that is greater than diameter 55 of stem 50 of mushroom handle 34*a* but less than diameter 56 of cap 52 of mushroom handle 34*a*. Thus, slotted member 72 may clip around stem 50 of mushroom handle 34*a* while cap 52 of mushroom handle 34*a* prevents slotted member 72 from sliding off of mushroom handle 34*a* along axis 58 of mushroom handle 34*a*. In some embodiments, slot 88 in slotted member 72 has width 90 from 1.5 cm to 3.5 cm. According to certain embodiments, slot 88 in slotted member 72 has width 90 from 2.0 cm to 3.0 cm. Slotted member 72 may have any suitable height 92. In some embodiments, height 92 of slotted member 72 is from 0.4 cm to 10.0 cm. In other embodiments, height 92 of slotted member 72 is from 1.5 cm to 4.5 cm.

Slotted member 72 may be formed from any suitable material. In some embodiments, slotted member 72 may be formed from a material that is softer than the material in crank handle 34. Thus, slotted member 72 may protect crank handle 34 from wear or damage. In some embodiments, slotted member 72 may be formed from a polymer such as, for example, polytetrafluoroethylene (e.g., Teflon®), polyoxymethylene (e.g., Delrin®), nylon plastic, and/or any suitable polymer. Slotted member 72 may be formed according to any suitable method. In some embodiments, slotted member 72 is milled or drilled to form slot 88. A sleeve may be milled or drilled in slotted member 72 to permit slotted member 72 to fit over prongs 94 formed in lever 70. Slotted member 72 may be affixed to lever 70 using any suitable fastener(s) and/or adhesive(s). Although FIG. 3 illustrates slotted member 72 as a single component, it should be understood that slotted member 72 may comprise multiple components.

In some embodiments, leverage tool 12 comprises one or more alignment members 74. Alignment member 74 may comprise any suitable structure for interfacing with crank handle 34. Alignment member 74 may be configured to interface with a particular crank handle 34 of crank assembly 30 while slotted member 72 may be configured to interface with a different crank handle 34 of crank assembly 30. In some embodiments, alignment member 74 assists operator 16 in aligning leverage tool 12 on crank assembly 30. For example, after operator 16 clips slotted member 72 around stem 50 of a first crank handle 34, operator 16 may then align leverage tool 12 by inserting a second crank handle 34 into an opening in alignment member 74.

In some embodiments, alignment member 74 is configured to mate with post handle 34*b* of crank assembly 30. Alignment member 74 may comprise at least one block of material having an opening into which post handle 34*b* may be inserted. As explained above, post handle 34*b* may comprise a post, tube, or protrusion without cap 52. Post handle 34*b* may be perpendicular to crank arm 32. In some embodiments, alignment member 74 comprises an alignment hole 96 into which post handle 34*b* may be inserted. Alignment hole 96 in alignment member 74 may have any suitable diameter 98. In some embodiments, diameter 98 of alignment hole 96 is slightly greater than diameter 60 of post handle 34*b*. For example, diameter 98 of alignment hole 96 may be two percent to thirty percent greater than diameter 60 of post handle 34*b*. As another example, diameter 98 of alignment hole 96 may be five percent to twenty percent greater than diameter 60 of post handle 34*b*. In some embodiments, diameter 98 of alignment hole 96 is from 1.0 cm to 4.0 cm. In other embodiments, diameter 98 of alignment hole 96 is from 1.5 cm to 2.75 cm. Alignment hole 96 in alignment member 74 may have any suitable length 102. Length 102 of alignment hole 96 may be less than, greater than, or substantially equal to height 62 of post handle 34*b*. In some embodiments, length 102 of alignment hole 96 is from 7.5 cm to 15.0 cm. In other embodiments, length 102 of alignment hole 96 is from 10.0 cm to 12.5 cm. It should be understood that alignment member 74 may have any suitable dimensions.

In some embodiments, alignment member 74 comprises a base block 104 and a stem block 106. Base block 104 and stem block 106 may be separate components that are formed from the same or from different material(s). Base block 104 and stem block 106 may each comprise a respective block of material comprising a hole for interfacing with post handle 34*b*. In some embodiments, base block 104 is affixed to a particular surface of lever 70 and stem block 106 is affixed to the opposite surface of lever 70 such that the respective holes in stem block 106 and base block 104 are aligned to form alignment hole 96 that permits post handle 34*b* to be inserted in alignment member 74. When alignment member 74 interfaces with post handle 34*b*, a surface of base member may contact crank arm 32. In some embodiments, when alignment member 74 interfaces with post handle 34*b*, a surface of stem block 106 may contact the distal end of post handle 34*b* (i.e., the end that is not affixed to crank arm 32). Base block 104 and/or stem block 106 may be affixed to lever 70 using any suitable fastener(s) and/or adhesive(s).

Base block 104 and/or stem block 106 may comprise any suitable type and/or combination of materials. In some embodiments, base block 104 and/or stem block 106 are formed of one or more materials that protect crank arm 32 and/or crank handle 34 from wear and/or damage. In some embodiments, base block 104 and/or stem block 106 are formed from one or more polymers such as, for example, polytetrafluoroethylene (e.g., Teflon®), polyoxymethylene (e.g., Delrin®), nylon plastic, and/or any suitable polymer. Base block 104 and/or stem block 106 may be formed according to any suitable method. In some embodiments, the respective holes in base block 104 and/or stem block 106 are milled or drilled using any suitable technique.

In some embodiments, leverage tool 12 comprises one or more lever handles 36. Lever handle 36 may be any suitable structure that operator 16 may grip to rotate leverage tool 12. In particular, operator 16 may grip and apply a force to lever handle 36, which may cause leverage tool 12 to rotate about crank axis 64. Lever handle 36 may comprise a knob, tube, ball, post, and/or any suitable structure. In some embodiments, lever handle 36 comprises a slip-resistant grip. For example, lever handle 36 may comprise a knurled grip, a contoured grip, an adhesive grip, and/or any suitable grip. Lever handle 36 may comprise any material that is sufficiently strong to transmit a force applied by operator 16 to rotate lever 70 of leverage tool 12. Lever handle 36 may comprise any suitable type and/or combination of metal, polymer, composite, and/or other suitable material.

Lever handle 36 may be affixed to lever 70 using any suitable fastener(s) and/or adhesive(s). In some embodiments, lever handle 36 is affixed to lever 70 using a fastener that permits lever handle 36 to rotate relative to (e.g., independently from) lever 70. For example, the fastener may comprise one or more bearings, bolts, and/or hinges.

In some embodiments, lever handle 36 comprises a metal tube that is affixed to lever with a bolt such as, for example, a shoulder bolt. In some embodiments, lever handle 36 comprises an aluminum tube having an outer surface that is knurled to provide a non-slip grip. The aluminum tube may be affixed to lever 70 using a bolt that is inserted through a hole in lever 70 and that is affixed to an inner surface of the aluminum tube. The bolt may permit the aluminum tube to rotate relative to lever 70. In some embodiments, the aluminum tube may be impregnated with a wear-resistant material to reduce friction between the aluminum tube and the bolt and/or lever 70. For example, the aluminum tube may be impregnated with polytetrafluoroethylene (e.g., Teflon®), polyoxymethylene (e.g., Delrin®), nylon plastic, and/or any suitable polymer. By configuring lever handle 36 to rotate relative to lever 70, radar system 10 may permit operator 16 to more easily rotate crank arm 32 to raise and/or lower radar antenna 14.

Although FIG. 3 illustrates leverage tool 12 comprising a single lever handle 36, it should be understood that leverage tool 12 may comprise any suitable number and/or combination of lever handles 36. For example, leverage tool 12 may be configured to comprise a respective lever handle 36 at each end of lever 70.

Figure 4B:
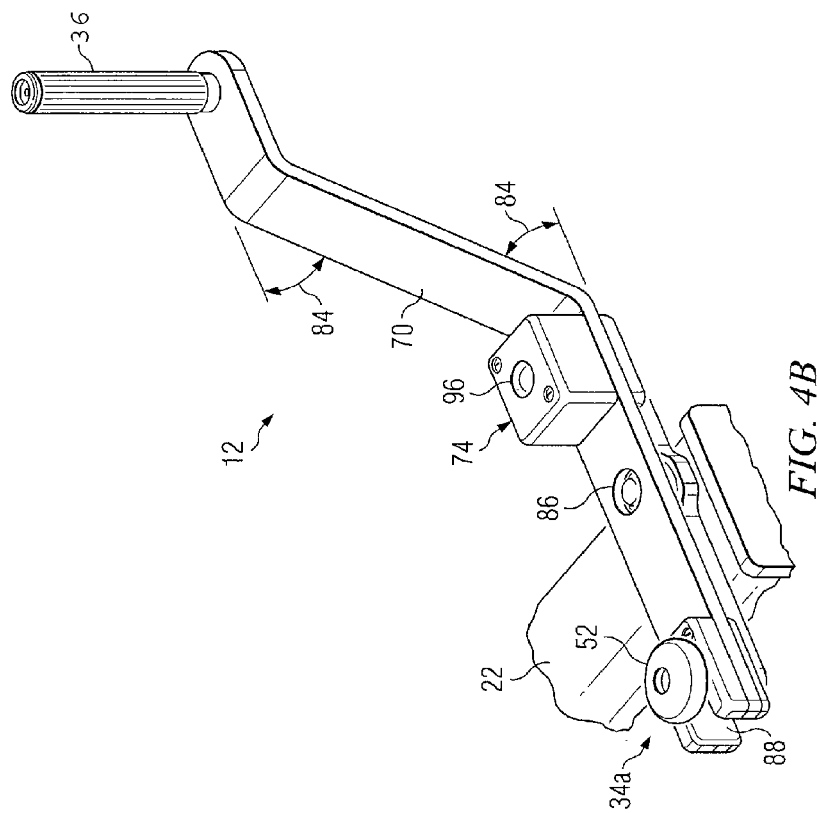
FIGS. 4A to 4B illustrate the positioning of a leverage tool on a crank assembly for a radar antenna, according to certain embodiments.
Figure 4A:
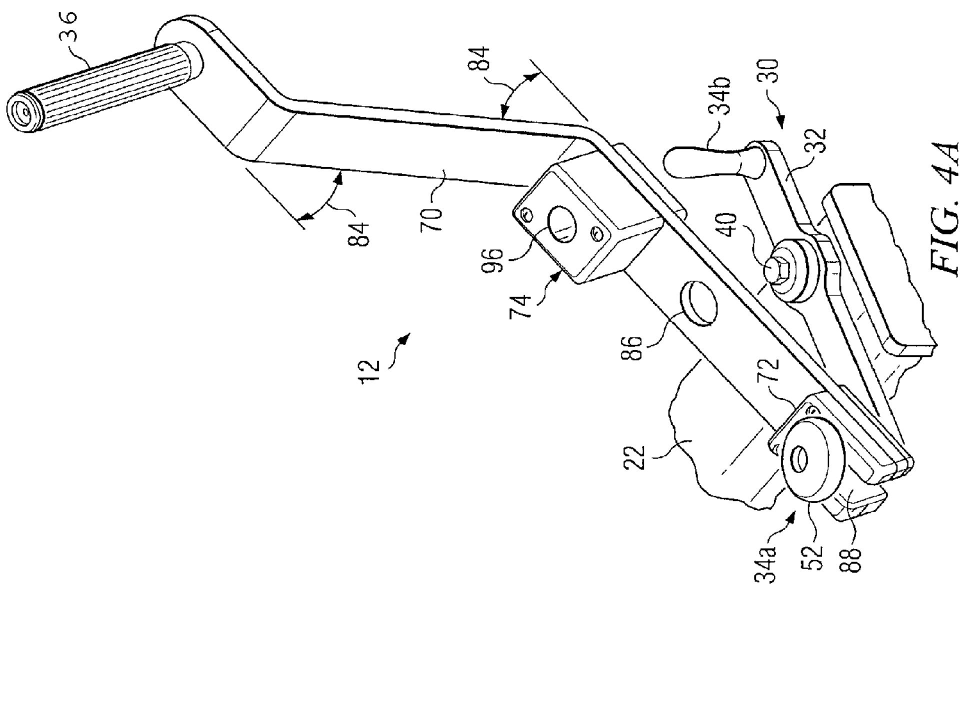

FIGS. 4A and 4B illustrate the positioning of leverage tool 12 on crank assembly 30 for radar antenna 14, according to certain embodiments. As explained above, the rotation of crank assembly 30 may cause jack 22 to raise or lower radar antenna 14. Crank assembly 30 may comprise crank arm 32 and one or more crank handles 34. In the illustrated embodiment, crank assembly 30 comprises two crank handles 34—mushroom handle 34*a* and post handle 34*b*. To operate crank assembly 30 using leverage tool 12, operator 16 may first slide slotted member 72 of leverage tool 12 around stem 50 of mushroom handle 34*a*. Width 90 of slot 88 in slotted member 72 may be greater than diameter 55 of stem 50 of mushroom handle 34*a* but less than diameter 56 of cap 52 of mushroom handle 34*a*. Thus, cap 52 of mushroom handle 34*a* may prevent slotted member 72 from vertically disengaging from mushroom handle 34*a*. While placing slotted member 72 around stem 50 of mushroom handle 34*a*, operator 16 may hold leverage tool 12 at an angle to permit alignment member 74 to clear post handle 34*b*. Accordingly, height 92 of slotted member 72 may be configured to permit leverage tool 12 to be titled at an angle. In some embodiments, height 92 of slotted member 72 may be from five percent to thirty percent less than height 54 of stem 50 of mushroom handle 34*a*. Slotted member 72 of leverage tool 12 may be configured to clip around stem 50 of mushroom handle 34*a* without the use of any fasteners. Thus, operator 16 may quickly and easily engage or disengage leverage tool 12 from crank assembly 30.

Once operator 16 places slotted member 72 of leverage tool 12 around stem 50 of mushroom handle 34*a*, operator 16 may then align leverage tool 12 with crank arm 32. Once leverage tool 12 is aligned with crank arm 32, operator 16 may lower leverage tool 12 such that post handle 34*b* is inserted in alignment hole 96 in alignment member 74. In some embodiments, length 102 of alignment hole 96 is substantially equal to height 62 of post handle 34*b*. Diameter 98 of alignment hole 96 may be greater than diameter 60 of post handle 34*b* such that post handle 34*b* may be inserted in alignment member 74. In some embodiments, as operator 16 lowers alignment member 74 over post handle 34*b*, pivot hole 86 in lever 70 may align with at least part of gear shaft 40 in jack 22. Alignment member 74 of leverage tool 12 may be configured to securely fit around post handle 34*b* without the use of any fasteners. Thus, operator 16 may quickly and easily engage or disengage leverage tool 12 from crank assembly 30.

According to certain embodiments, lever 70 in leverage tool 12 is bent between alignment member 74 and lever handle 36. Lever 70 may be bent to provide clearance between lever handle 36 and cabinets 24 and other hardware on radar antenna 14. Thus, lever handle 36 may be outside the plane of crank arm 32 and cabinets 24. Lever handle 36 may be bent according to any suitable angle 84. In some embodiments, lever 70 may be bent at angle 84 between twenty and sixty degrees. According to certain embodiments, lever 70 may be bent at angle 84 between thirty and fifty degrees. By configuring lever handle 36 to be outside the plane of cabinets 24, crank arm 32, and/or crank handles 34, radar system 10 may permit operator 16 to rotate leverage tool 12 with little or no risk that operator 16 will injure his or her hands.

Lever 70 in leverage tool 12 may have any suitable length 82. In some embodiments, lever 70 in leverage tool 12 is longer than crank arm 32. For example, lever 70 may be from fifty to three-hundred percent longer than crank arm 32. Accordingly, the mechanical advantage provided by leverage tool 12 may be greater than the mechanical advantage provided by crank arm 32 alone. In some embodiments, the use of leverage tool 12 provides at least forty percent more leverage than the use of crank arm 32 alone without leverage tool 12. In other embodiments, the use of leverage tool 12 provides at least fifty percent more leverage than the use of crank arm 32 alone without leverage tool 12. In some embodiments, to raise or lower radar antenna 14, operator 16 may be required to rotate crank arm 32 over one hundred times. The additional leverage provided by leverage tool 12 may reduce the effort needed to raise and/or lower radar antenna 14. As a result, by providing leverage tool 12, radar system 10 may reduce the fatigue experienced by operator 16 in raising or lowering radar antenna 14. In some embodiments, because leverage tool 12 is longer than crank arm 32, operator 16 may more easily reach leverage tool 12. Thus, leverage tool 12 may permit operator 16 to maintain a better posture and/or more secure footing while raising and/or lowering radar antenna 14.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. An apparatus, comprising:

a lever operable to rotate a crank arm, the lever comprising at least one crank arm interface;

a slotted member affixed to an end of the lever, the slotted member comprising a first crank arm interface operable to clip around a first handle of the crank arm;

an alignment member affixed to the lever, the alignment member comprising a second crank arm interface forming a hole operable to receive a second handle of the crank arm; and a lever handle affixed to the lever such that a force applied to the lever handle causes the lever to rotate, the rotation of the lever causing the crank arm to rotate in a particular plane, the lever handle being offset from, and perpendicular to, the particular plane.

2. The apparatus of claim 1, wherein:

the alignment member is affixed to the lever between the slotted member and the lever handle; and the lever is a strip of material that is angled between the alignment member and the lever handle such that the lever handle is offset from the particular plane by at least five centimeters.

3. The apparatus of claim 1, wherein:

the lever is a strip of aluminum; and the lever handle comprises a metal tube having an axis perpendicular to a surface of the lever, the metal tube configured to rotate independently from the lever.

4. The apparatus of claim 1, wherein:

the lever is strip of material comprising at least two prongs at the first end of the lever; and the slotted member is a polymer sleeve that is affixed to the at least two prongs, the polymer sleeve preventing direct contact between the lever and the first handle of the crank arm.

5. The apparatus of claim 1, wherein the slotted member comprises at least one of polytetrafluoroethylene, polyoxymethylene, and nylon plastic.

6. The apparatus of claim 1, wherein the force applied to the lever handle causes the lever to rotate about an axis between the slotted member and the alignment member.

7. The apparatus of claim 1, wherein the first handle of the crank arm comprises:

a stem that is perpendicular to the crank arm, the stem having a first diameter; and a cap that is perpendicular to the stem, the cap having a second diameter that is greater than the first diameter.

8. The apparatus of claim 7, wherein the slotted member comprises a slot that clips around the stem of the first handle, the slot having a width that is greater than the first diameter of the stem but less than the second diameter of the cap.

9. The apparatus of claim 1, wherein:

the second handle is a cylindrical member that is perpendicular to the crank arm, the second handle having a first diameter;

the alignment member comprises:

a first polymer block affixed to a first surface of the lever; and a second polymer block affixed to a second surface of the metal strip, the second polymer block affixed to the metal strip directly opposite from the first polymer block; and the hole is formed through the first polymer block, the lever, and the second polymer block, the hole having a second diameter that is greater than the first diameter of the second handle.

10. The apparatus of claim 1, wherein the alignment member comprises at least one of polytetrafluoroethylene, polyoxymethylene, and nylon plastic.

11. The apparatus of claim 1, wherein the lever is secured to the crank arm by only clipping the slotted member around the first handle and inserting the second handle in the hole in the alignment member.

12. The apparatus of claim 1, wherein:

the rotation of the crank arm actuates a jack that moves at least one object; and the lever is longer than the crank arm such that the lever provides greater leverage than the crank arm.

13. A method, comprising:

forming a lever that is angled such that a first section of the lever is offset from a second section of the lever;

affixing a slotted member to an end of the first section of the lever, the slotted member comprising a crank arm interface forming a slot operable to clip around a first handle of a crank arm;

affixing an alignment member to the first section of the lever, the alignment member comprising a second crank arm interface forming a hole operable to receive a second handle of the crank arm; and affixing a lever handle to the second section of the lever, the lever handle comprising a cylindrical member that is perpendicular to the second section of the lever and that rotates independently from the lever.

14. The method of claim 13, further comprising forming at least two prongs in the end of the first section of the lever, and wherein affixing the slotted member to the end of the first section of the lever comprises inserting the slotted member between the at least two prongs.

15. The method of claim 13, wherein:

the first handle of the crank arm comprises:

a stem that is perpendicular to the crank arm, the stem having a first diameter; and a cap that is perpendicular to the stem, the cap having a second diameter that is greater than the first diameter; and the slotted member comprises a slot having a width that is greater than the first diameter of the stem but less than the second diameter of the cap.

16. The method of claim 13, wherein:

the second handle is a cylindrical member that is perpendicular to the crank arm, the second handle having a first diameter; and the hole in the alignment member has a second diameter that is greater than the first diameter of the second handle.

17. The method of claim 13, wherein the slotted member and the alignment member comprise at least one of polytetrafluoroethylene, polyoxymethylene, and nylon plastic.

18. The method of claim 13, wherein the lever comprises an anodized strip of aluminum and the lever handle comprises a knurled tube that rotates relative to the lever.

19. The method of claim 13, wherein the lever is angled such that rotation of the lever about a crank axis causes the slotted member to rotate in a first plane and causes the lever handle to rotate in a second plane that is offset from the first plane by at least five centimeters.

20. A system, comprising:

a crank arm;

a first handle affixed to a first end of the crank arm;

a second handle affixed to a second end of the crank arm;

a leverage tool operable to interface with the first handle and the second handle, the leverage tool comprising:

a lever operable to rotate the crank arm;

a slotted member affixed to an end of the lever, the slotted member operable to clip around the first handle of the crank arm;

an alignment member affixed to the lever, the alignment member comprising a hole operable to receive the second handle of the crank arm; and a lever handle affixed to the lever such that a force applied to the lever handle causes the lever to rotate, the rotation of the lever causing the crank arm to rotate.

21. The system of claim 20, wherein the first handle comprises a stem and the slotted member of the leverage tool is operable to clip around the stem.

* * * * *

UNITED STATES PATENT AND TRADEMARK OFFICE

CERTIFICATE OF CORRECTION

PATENT NO. : 8,360,396 B2
APPLICATION NO. : 12/405524
DATED : January 29, 2013
INVENTOR(S) : Robledo It is certified that error appears in the above-identified patent and that said Letters Patent is hereby corrected as shown below:

In the Specification

Col. 1, line 6, Section entitled Government Funding, "The U.S. Government may have certain rights in this invention as provided for by the terms of U.S. Goverment Contract No. DAAH01-03-C -0140 granted by the Department of the Army." should read --This invention was made with Government support under contract no. DAAH01-03-C-0140 awarded by the Department of the Army. The Government has certain rights in the invention.--.

Signed and Sealed this
First Day of April, 2014

Michelle K. Lee
*Deputy Director of the United States Patent and Trademark Office*